United States Patent
Tomesch et al.

(10) Patent No.: US 9,938,131 B2
(45) Date of Patent: Apr. 10, 2018

(54) WINE DISPENSER THAT PROTECTS UNPOURED WINE FROM OXIDATION BY PREVENTING AIR FROM ENTERING THE DISPENSER WHEN PARTIALLY FULL

(71) Applicants: Harald George Tomesch, Bayside, WI (US); Markus Stefan Schneider, Karlsruhe (DE); Ralph Schmidt, Cambridge (CA)

(72) Inventors: Harald George Tomesch, Bayside, WI (US); Markus Stefan Schneider, Karlsruhe (DE); Ralph Schmidt, Cambridge (CA)

( * ) Notice: Subject to any disclaimer, the term of this patent is extended or adjusted under 35 U.S.C. 154(b) by 0 days.

(21) Appl. No.: 15/366,272

(22) Filed: Dec. 1, 2016

(65) Prior Publication Data

US 2017/0101303 A1    Apr. 13, 2017

Related U.S. Application Data

(63) Continuation of application No. 14/882,429, filed on Oct. 13, 2015.

(51) Int. Cl.
*B67D 7/60* (2010.01)
*G01F 11/00* (2006.01)
(Continued)

(52) U.S. Cl.
CPC ......... *B67D 3/007* (2013.01); *B65D 47/2006* (2013.01); *B65D 47/2031* (2013.01);
(Continued)

(58) Field of Classification Search
CPC . B67D 3/007; B65D 47/2006; B65D 83/0033
(Continued)

(56) References Cited

U.S. PATENT DOCUMENTS 3,918,355 A * 11/1975 Weber ................... A47J 31/057
                                                    222/146.5
4,162,749 A    7/1979 Bennett
(Continued)

OTHER PUBLICATIONS

Web Link: http://www.sunsky-online.com/product/default!view.do?subject.id=240431 Downloaded May 14, 2015 Wine Bar Butler—Single Optic 25ML Rotary 1 Shot Alcohol Dispenser Dispenser This 25ml spirit measure can be fitted to the wall or onto a shelf, has a spring-loaded receptacle that holds bottles of various sizes up to 1 liter, and prevents wastage or spillages.

(Continued)

*Primary Examiner* — Jeremy W Carroll
(74) *Attorney, Agent, or Firm* — Russ Weinzimmer & Associates, PC (57) ABSTRACT

A wine dispenser is disclosed that protects unpoured wine from oxidation due to exposure to air within the dispenser. The dispenser includes a dispenser body having a weighted piston disposed within, the weighted piston being configured to move toward the dispensing end of the dispenser body when the dispenser is tilted downward, causing wine to be dispensed via a dispensing assembly. The dispensing assembly includes a lid having a wine flow channel that provides a path for wine to flow out of the dispenser body, and a unidirectional flow valve that is biased in a closed air-tight state to prevent air from entering the dispenser body via the wine flow channel, unless the unidirectional flow valve is forced into an open state, thereby allowing wine to flow out from the dispenser body via the wine flow channel, and then out of the dispenser via a pouring neck.

5 Claims, 10 Drawing Sheets

(51) Int. Cl.
| | | |
|---|---|---|
| B67D 3/00 | (2006.01) | |
| B65D 47/20 | (2006.01) | |
| B65D 83/00 | (2006.01) | |
| G01F 17/00 | (2006.01) | |
| G01K 11/12 | (2006.01) | |
| B65D 47/26 | (2006.01) | |
| B65D 85/72 | (2006.01) | |

(52) U.S. Cl.
CPC ....... *B65D 47/263* (2013.01); *B65D 83/0005* (2013.01); *B65D 83/0011* (2013.01); *B65D 83/0033* (2013.01); *B65D 85/72* (2013.01); *B67D 3/0051* (2013.01); *G01F 17/00* (2013.01); *G01K 11/12* (2013.01)

(58) Field of Classification Search
USPC .......................... 222/331, 548, 553, 523, 386
See application file for complete search history.

(56) References Cited

U.S. PATENT DOCUMENTS

| | | | |
|---|---|---|---|
| 4,807,785 | A | 2/1989 | Pritchett |
| 4,982,879 | A | 1/1991 | Corrado et al. |
| 5,097,991 | A | 3/1992 | Lance |
| 8,365,931 | B2 | 2/2013 | Rees et al. |
| 8,746,502 | B2 | 6/2014 | Lambrecht |
| 8,844,743 | B2 * | 9/2014 | Costa ................... B65D 1/0292 141/114 |
| 8,870,093 | B2 * | 10/2014 | Brummitt ............... B05B 7/045 222/105 |
| 8,919,610 | B2 | 12/2014 | Haley et al. |
| 2002/0088827 | A1 * | 7/2002 | Colucci ................ B65D 81/245 222/386 |
| 2013/0008924 | A1 * | 1/2013 | Lafosse ............... B05B 11/0013 222/256 |
| 2015/0284163 | A1 * | 10/2015 | Manwani ............. B67D 3/0067 222/105 |
| 2015/0321807 | A1 * | 11/2015 | Cotton ................... A47G 19/12 220/227 |

OTHER PUBLICATIONS

Web Link: http://www.wineenthusiast.com/krups-wine-dispenser.asp Downloaded May 14, 2015 KRUPS Wine Dispenser A mechanical pump inside the machine dispenses and preserves (delays wine oxidation by vacuuming) the wine. Wine is preserved 5-7 days for white wine and 7-10 days for red wine.

Web Link: http://www.coravin.com/coravin-systems/coravin-1000-wine-access-system.html Downloaded May 14, 2015 Coravin™ 1000WINE Access System Its innovative design keeps your wine safe from oxidation, allowing it to continue to age naturally, giving you the freedom to pour a glass from any bottle at any time.

Web Link: http://global.rakuten.com/en/store/wish-co/item/vinaera-mv6/ Downloaded May 14, 2015 Vinaera Electronic Wine Aerator Prevents unwanted oxidation, keep delicious wine.

* cited by examiner

WINE DISPENSER THAT PROTECTS UNPOURED WINE FROM OXIDATION BY PREVENTING AIR FROM ENTERING THE DISPENSER WHEN PARTIALLY FULL

CROSS-REFERENCE TO RELATED APPLICATIONS

This application is a Continuation In Part of U.S. patent application Ser. No. 14/882,429, filed Oct. 13, 2015, the entire contents of which is incorporated herein by reference.

FIELD OF THE INVENTION

The present invention relates generally to wine dispensers, and more particularly to wine dispensers for prolonging wine quality.

BACKGROUND OF THE INVENTION

Wine is a delicate beverage that must be handled properly to preserve its quality. For centuries, wine has been enjoyed in bottled form, normally sealed with an airtight cork. Once opened, the characteristics of the wine in the bottle begin to change. Almost immediately, the wine begins to oxidize rapidly, degrading the taste and other noticeable qualities of the wine. Since most wines begin to oxidize within minutes of being opened, and many wines are discarded due to the degree of oxidization at the end of each business day, almost all wines are discarded two or three days after opening, regardless of how much wine has been consumed. Wine servers strive to be vigilant to monitor open bottle dates, and discard the wines they serve when quality falls below an acceptable level; restaurants similarly expense wine offerings based on the first and perhaps only glass of wine sold from a bottle. Restaurants thus often limit the number of wines they have available for sale by the glass, and they limit the number of expensive wines sold by the glass, because of the rapid oxidization of wine contained therein once the bottle is opened.

There are a number of known arrangements that seek to preserve wine in an opened bottle which include placing a temporary stopper or seal in the bottle, and evacuating the air from the bottle above the remaining wine. However, these arrangements remove smell (or "nose") characteristics from the wine during air evacuation. Further, every wine has gas naturally stored within its composition and the vacuum actually draws out those gasses, thereby further affecting the taste and quality of the wine. Other arrangements include placing an inert gas such as nitrogen or argon into the bottle to displace the air. These systems can be used alone or also with a temporary stopper or seal. However, the natural gas composition of the wine is nevertheless affected by adding pressure to the wine, ultimately changing its composition. The relative expense of the argon/nitrogen system, along with the ongoing expense of purchasing additional food-grade argon and nitrogen cartridges, prevents most winery operations or restaurants from purchasing an argon/nitrogen system for each wine it serves or tastes.

Furthermore, wineries and restaurants rarely use such systems effectively during the day for sales by the glass or for wine tastings, but largely utilize these arrangements at closing time. The result is such that wines by the glass do not present themselves well to the consumer, since the quality of the wine in the partially filled bottle rapidly decays.

SUMMARY OF THE INVENTION

The present invention provides a simple and inexpensive dispenser for wine that can be used immediately after a standard bottle of wine is opened so that contact between the wine and the ambient air is significantly reduced, and the wine can be preserved for use by a wine server, such as a winery, bar, or restaurant, or the consumer. The exposure to oxygen in the air, and any resulting degradation in the wine, is limited to the time it takes to pour the wine from a wine bottle into the dispenser, which is equal to the exposure to air when the wine was bottled by the wine producer.

The wine dispenser of the present invention includes a weighted piston that, upon tilting of the dispenser so that the neck of the dispenser is below the bottom of the dispenser, urges wine stored in the dispenser to move toward a one-way valve cooperative with a lid of the dispensing device until a desired quantity of wine is dispensed. After a desired quantity of wine has been dispensed, the bottle is tilted into a vertical position, causing the weighted piston to pull the wine downward against the valve within the neck, thereby closing the valve. The weighted piston remains in this static air-tight position until the server again dispenses wine, at which time the piston again slides downward and towards the neck of the dispensing device to displace another desired quantity of wine. The wine does not flow unless the neck of the dispenser falls below the bottom of the dispenser so as to allow the weighted piston to move towards the valve, thereby opening the valve and allowing the wine to flow.

The dispensing device of the present invention is constructed from food grade glass, stainless steel, or plastic, and is graduated by volume in some embodiments. In other embodiments, temperature sensitive strips embedded in the wall of the dispenser allow for optimum serving conditions by indicating temperature.

A general aspect of the invention is a wine dispenser that protects unpoured wine from oxidation. The wine dispenser includes: a dispenser body configured to contain wine, the dispenser body having a piston-stop end and a wine dispensing end, the dispenser body having a portion of uniform cross section between the piston-stop end and the wine dispensing end; a weighted piston disposed within the dispenser body, the weighted piston being configured to move along the portion of uniform cross section toward the wine dispensing end of the dispenser body when wine is dispensed; and a dispensing assembly attached to the wine dispensing end of the dispenser body, the dispensing assembly including: a lid sealed to the wine dispensing end of the dispenser body, the lid having a wine flow channel that provides a path for wine to flow out from the dispenser body; a unidirectional flow valve, the unidirectional flow valve being attached to the lid so as to be cooperative with the wine flow channel, the unidirectional flow valve being biased in a closed air-tight state so as to prevent flow of air into the dispenser body via the wine flow channel, the unidirectional flow valve also being configured to allow wine to flow out from the dispenser body via the wine flow channel; and a pouring neck, the pouring neck having a pouring end and a receiving end, the receiving end being configured to receive any wine that flows out from the dispenser body via the wine flow channel, and guide the wine so as to exit the pouring neck via the pouring end.

In some embodiments, the dispensing assembly further includes a shoulder attached to the lid sealed to the wine dispensing end of the dispenser body, the shoulder also being cooperative with the pouring neck. In further embodiments, the pouring neck is in slidable relationship with the shoulder. In other further embodiments, the pouring neck is in fixed relationship with the shoulder.

In some embodiments, the receiving end of the pouring neck includes at least one sliding sealing ring, and wherein the lid includes a cylinder that surrounds the unidirectional flow valve and the wine flow channel, the cylinder projecting coaxially and being of a diameter so as to sealably and slidably cooperate with the receiving end of the pouring neck and the at least one sliding sealing ring. In further embodiments, the receiving end of the pouring neck is configured to be pressed against the unidirectional flow valve so as to seal the wine flow channel, thereby preventing flow of wine out of the dispenser body.

In some embodiments, the weighted piston includes at least one sliding sealing ring, the weighted piston and the sliding sealing ring being sized so as to slidably seal the piston-stop end of the dispenser body.

In some embodiments, the weighted piston includes two sliding sealing rings, the weighted piston and the sliding sealing rings being sized so as to slidably seal the piston-stop end of the dispenser body.

In some embodiments, the weighted piston includes a weight configured to cause the weighted piston to move along the portion of uniform cross section towards the wine dispensing end of the dispenser body when the dispenser body is tilted.

In some embodiments, the weighted piston includes a weight configured to cause the weighted piston to move along the portion of uniform cross section towards the wine dispensing end of the dispenser body, and cause the unidirectional flow valve to enter an open state, when the dispenser body is tilted.

In some embodiments, the lid sealed to the wine dispensing end of the dispenser body is sealed via a stationary sealing ring.

Another general aspect of the invention is a wine dispenser that protects unpoured wine from oxidation. This wine dispenser includes: a dispenser body configured to contain wine, the dispenser body having a piston-stop end and a wine dispensing end, the dispenser body having a portion of uniform cross section between the piston-stop end and the wine dispensing end; a weighted piston disposed within the dispenser body, the weighted piston being configured to move along the portion of uniform cross section toward the wine dispensing end of the dispenser body when wine is dispensed; and a dispensing assembly attached to the wine dispensing end of the dispenser body. The dispensing assembly includes: a lid sealed to the wine dispensing end of the dispenser body, the lid having a wine flow channel that provides a path for wine to flow out from the dispenser body; a unidirectional flow valve, the unidirectional flow valve being attached to the lid so as to be cooperative with the wine flow channel, the unidirectional flow valve being biased in a closed air-tight state so as to prevent flow of air into the dispenser body via the wine flow channel, the unidirectional flow valve also being configured to allow wine to flow out from the dispenser body via the wine flow channel; a pouring neck, the pouring neck having a pouring end and a receiving end, the receiving end being sealed around the unidirectional flow valve and the wine flow channel, the pouring neck being configured to guide the wine from the wine flow channel and out the pouring end; and a shoulder attached around the periphery of the lid, the shoulder also being attached around the pouring neck between the receiving end and the pouring end.

In some embodiments, the lid sealed to the wine dispensing end of the dispenser body is sealed via a stationary sealing ring.

In some embodiments, the weighted piston includes at least one sliding sealing ring, the weighted piston and the sliding sealing ring being sized so as to slidably seal the piston-stop end of the dispenser body.

In some embodiments, the weighted piston includes two sliding sealing rings, the weighted piston and the sliding sealing rings being sized so as to slidably seal the piston-stop end of the dispenser body.

In some embodiments, the weighted piston includes a weight configured to cause the weighted piston to move along the portion of uniform cross section towards the wine dispensing end of the dispenser body when the dispenser body is tilted.

In some embodiments, the weighted piston includes a weight configured to cause the weighted piston to move along the portion of uniform cross section towards the wine dispensing end of the dispenser body, and cause the unidirectional flow valve to enter an open state when the dispenser body is tilted.

Yet another general aspect of the invention is a wine dispenser that protects unpoured wine from oxidation. This wine dispenser includes: a dispenser body configured to contain wine, the dispenser body having a piston-stop end and a wine dispensing end, the dispenser body having a portion of uniform cross section between the piston-stop end and the wine dispensing end; a weighted piston disposed within the dispenser body, the weighted piston being configured to move along the portion of uniform cross section towards the wine dispensing end of the dispenser body when wine is dispensed; and a dispensing assembly attached to the wine dispensing end of the dispenser body. This dispensing assembly includes: a lid sealed to the wine dispensing end of the dispenser body, the lid having a wine flow channel that provides a path for wine to flow out from the dispenser body; a unidirectional flow valve, the unidirectional flow valve being attached to the lid so as to be cooperative with the wine flow channel, the unidirectional flow valve being biased in a closed air-tight state so as to prevent flow of air into the dispenser body via the wine flow channel, the unidirectional flow valve also being configured to allow wine to flow out from the dispenser body via the wine flow channel; a pouring neck, the pouring neck having a pouring end and a receiving end, the receiving end being configured to receive any wine that flows out from the dispenser body via the wine flow channel, and guide the wine so as to exit the pouring neck via the pouring end; and a shoulder attached to the lid of the dispenser body, the pouring neck being in slidable relationship with the shoulder, the receiving end of the pouring neck including at least one sliding sealing ring, the lid including a cylinder that surrounds the unidirectional flow valve and the wine flow channel, the cylinder projecting coaxially and being of a diameter so as to sealably and slidably cooperate with the receiving end of the pouring neck and the at least one sliding sealing ring.

In some embodiments, the receiving end of the pouring neck is configured to be pressed against the unidirectional flow valve so as to seal the wine flow channel, thereby preventing flow of wine out of the dispenser body.

In some embodiments, the weighted piston includes two sliding sealing rings, the weighted piston and the sliding sealing rings being sized so as to slidably seal the piston-stop end of the dispenser body, and wherein the weighted piston includes a weight configured to cause the weighted piston to move along the portion of uniform cross section towards the wine dispensing end of the dispenser body, and cause the unidirectional flow valve to enter an open state, when the dispenser body is tilted, thereby allowing flow of wine out of the dispenser body.

BRIEF DESCRIPTION OF THE DRAWINGS

Many additional features and advantages will become apparent to those skilled in the art upon reading the following description, when considered in conjunction with the accompanying drawings, wherein.

DETAILED DESCRIPTION

Figure 1:
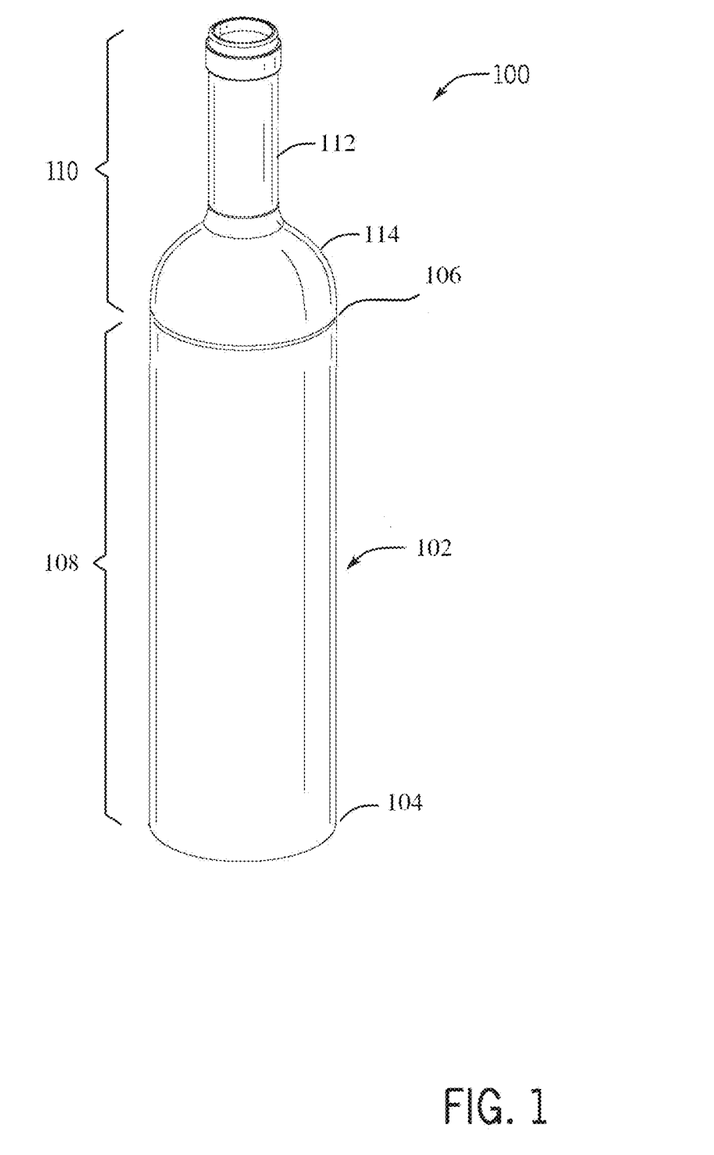
FIG. 1 is a perspective view from above showing the wine dispensing device having an embodiment of a weighted piston.

Attention is now direct to FIG. 1, showing a perspective view of the wine dispensing device 100.

FIG. 1 is a perspective view from above showing the wine dispenser 100 that protects unpoured wine from oxidation. The wine dispenser 100 has a dispenser body 102 configured to contain wine. The dispenser body 102 has a piston-stop end 104 and a wine dispensing end 106. The dispenser body 102 has a portion of uniform cross section 108 between the piston-stop end 104 and the wine dispensing end 106. Note that there could be a flared portion extending from one or both of the piston-stop end 104 and the wine dispensing end 106. Nevertheless, a piston 200 (see FIG. 2) will move only along the portion of uniform cross section 108.

A dispensing assembly 110 is attached to the wine dispensing end 106 of the dispenser body 102. The dispensing assembly 110 includes: a pouring neck 112 and a shoulder 114.

Figure 2:
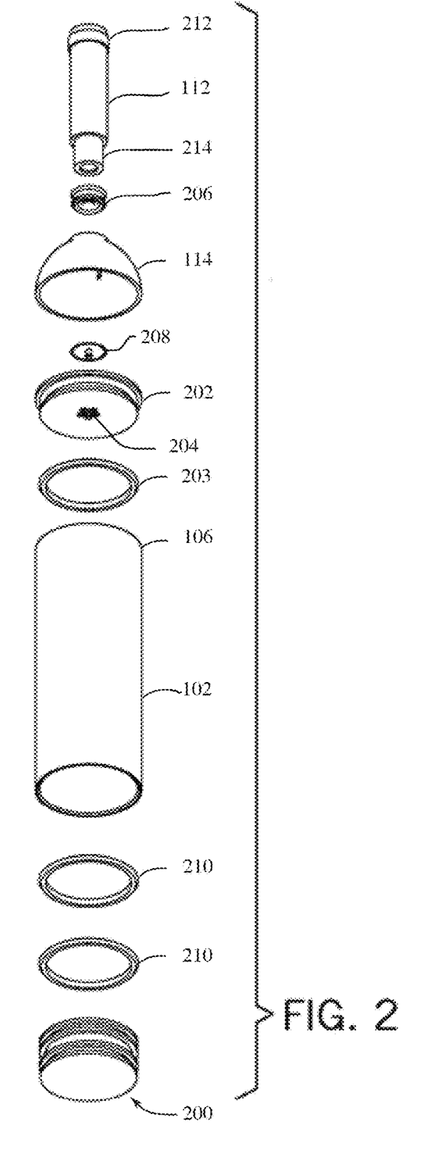
FIG. 2 is an exploded perspective view slightly from below showing the wine dispensing device of FIG. 1.

Referring to FIG. 2, underneath the shoulder 114 is a lid 202 sealed to the wine dispensing end 106 of the dispenser body 102 via a lid seal 203. The lid 202 has a wine flow channel 204 that provides a path for wine to flow out from the dispenser body 102 to the pouring neck 112. The pouring neck 112 can be cooperative with the lid 202 via a pouring neck seal 206.

The shoulder 114 is attached to the lid 202 that is sealed to the wine dispensing end 106 of the dispenser body 102, the shoulder 114 also being cooperative with the pouring neck 112. In some embodiments, the pouring neck 112 is in slidable relationship with the shoulder 114 (see for example, FIGS. 10A, 10B, 10C). In other embodiments, the pouring neck 112 is in fixed relationship with the shoulder 114 (see for example, FIGS. 10D and 10E).

The lid 202 includes a unidirectional flow valve (also called an "umbrella valve") 208. The unidirectional flow valve 208 is attached to the lid 202 so as to be cooperative with the wine flow channel 204. The unidirectional flow valve 208 is biased in a closed air-tight state so as to prevent air from entering the dispenser body 102. Nevertheless, wine can flow out of the dispenser body 102 via the wine flow channel 204 when the unidirectional flow valve 208 is able to be in an open state, thereby allowing wine to flow out from the dispenser body 102 via the wine flow channel 204 to the pouring neck 112.

Inside the dispenser body 102 is a weighted piston 200 that sealably and slidably engages the inner wall of the dispenser body 102 via two ring seals 210. The weighted piston 200 is within the dispenser body 102, and is configured to move along the portion of uniform cross section 108 toward the wine dispensing end 106 of the dispenser body 102 when the dispenser 100 is tilted until wine is dispensed. The weight of the weighted piston 200 is sufficient to enable it to sealably slide along the dispenser body in response to tilting of the dispenser such that the pouring neck 112 is tilted downward. For example, an effective weight of the weighted piston 200 is 1 pound or 1.5 pounds. 0.5 to 2 pounds is an effective range.

Regarding the pouring neck 112, the pouring neck 112 has a pouring end 212 and a receiving end 214, the receiving end 214 being configured to receive any wine that flows out from the dispenser body 102 via the wine flow channel 204, and guide the wine so as to exit the pouring neck 112 via the pouring end 212.

Figure 3:
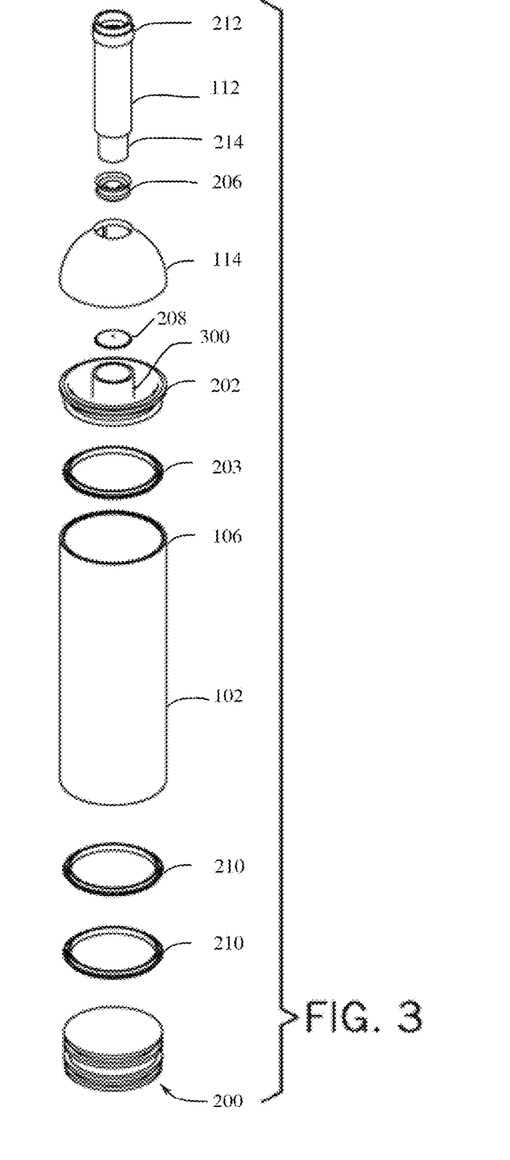
FIG. 3 is an exploded perspective view slightly from above showing the wine dispensing device of FIG. 1.

FIG. 3 provides another exploded perspective view, slightly from above, showing the wine dispensing device 100 of FIGS. 1 and 2. This view includes the receiving collar 300 of the lid 202. The receiving collar 300 receives the receiving end 214 of the pouring neck 112 after passing through the pouring neck seal 206.

Figure 4:
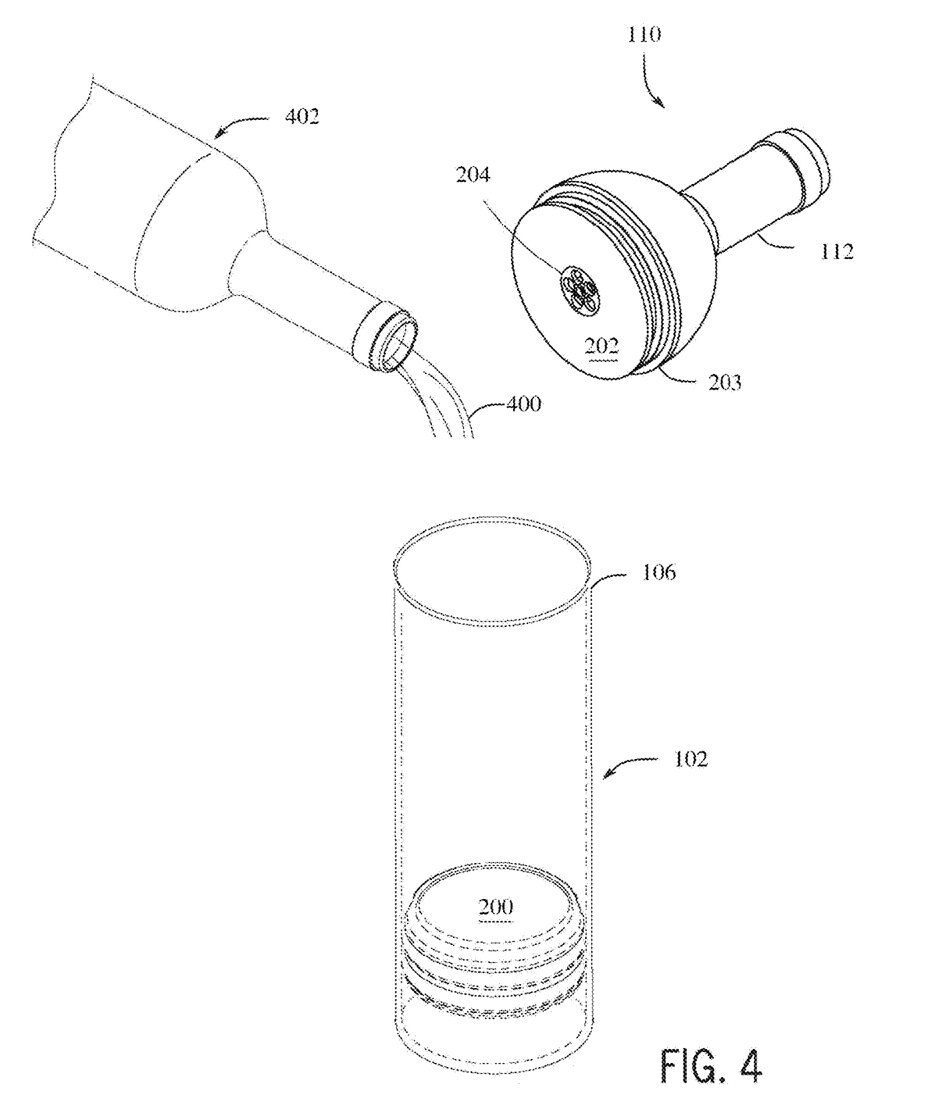
FIG. 4 is a perspective view of wine being poured from a recently opened bottle of wine into the lower portion of the wine dispensing device of FIG. 1, also showing the upper portion of the device.

FIG. 4 is a perspective view of the wine dispensing device 100 being filled with wine 400 poured from a recently opened bottle 402 of wine into the lower portion 102 of the wine dispensing device 100 having the weighted piston 200. Also shown is the upper portion 110 of the device 100 having the wine flow channel 204 to the pouring neck 112, the upper portion 110 being inserted into the wine dispensing end 106 of the dispenser body 102 after all the wine 400 is poured. The seal 203 ensures an air-tight and water-tight fit. Then, the piston 200 is pushed up to remove most or substantially all of the air remaining at the top of the dispenser body 102.

Figure 5:
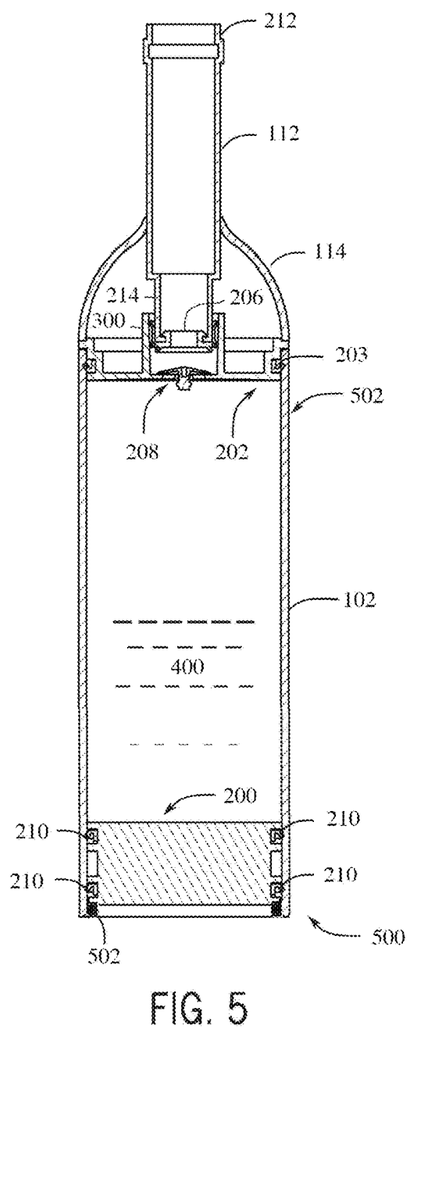
FIG. 5 is a cutaway side view of the wine dispensing device of FIG. 1, showing the unidirectional valve in a closed configuration.

FIG. 5 is a cutaway side view of the wine dispensing device 100, showing the unidirectional flow valve 208 in a closed configuration, while the pouring neck 112 is in an open position, the receiving end 214 of the pouring neck 112 being backed off from the valve 208, thereby allowing the valve 208 to open in response to fluid pressure from the wine 400 in the dispenser body 102. In the absence of fluid pressure from the wine 400 (or air pressure) in the dispenser body 102, the valve 208 remains closed.

FIG. 5 also shows that the weighted piston 200 at the piston-stop end 500, having a piston stop 502, the piston stop end 500 being the end of the dispenser body 102 where the piston 200 is located when the dispenser 100 is holding the maximum volume of wine it can hold. By contrast, the wine dispensing end 502 of the dispenser body 102 is the opposite end where piston 200 is located when the dispenser 100 is holding the minimum volume of wine 400 it can hold after dispensing substantially all of the wine 400.

Figure 6:
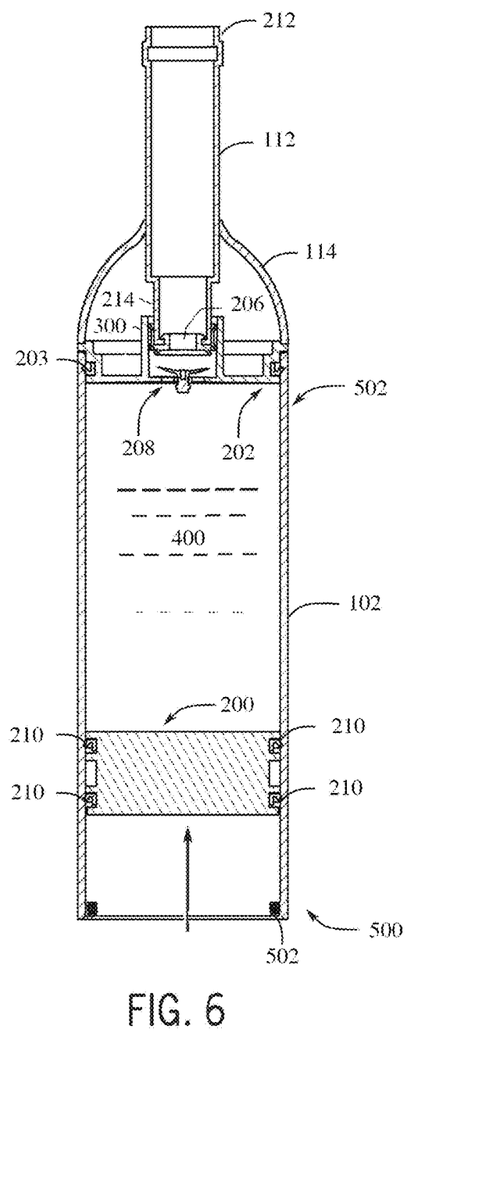
FIG. 6 is a cutaway side view of the wine dispensing device of FIG. 1, showing the unidirectional valve in an open configuration while permitting air to flow therethrough as the weighted piston moves along a portion of uniform cross section towards the unidirectional valve due to tilting the dispensing device.

FIG. 6 is a cutaway side view of the wine dispensing device 100 in an upright position, showing the unidirectional valve 208 in an open configuration while permitting air to flow therethrough as the weighted piston 200 moves along a portion of uniform cross section 108 towards the unidirectional valve 208 by manually pushing the piston upwards towards the dispensing end 106, such as when "priming" the dispenser 100 so as to remove as much air as possible from the dispenser body 102, leaving only wine 400.

FIG. 6 shows the open configuration of the valve 208 due to the dispensing device 100 being subjected to pushing the weighted piston 200 upward into the dispenser body 102. If the dispenser body 102 is full of wine 400, then wine will flow past the valve 208. If the dispenser body 102 is only partially full, where the remainder of the volume of the dispenser body 102 is filled with air, then air can be removed from the dispenser body 102 by keeping the dispenser 100 in an upright position while manually pushing up the weighted piston 200, thereby allowing air to leave the dispenser body 102 via the flow channel 204 and the valve 208, the process of substantially removing almost all of the air from the dispenser body 102, leaving only wine 400, being called "priming" the dispenser 100.

Figure 7A:
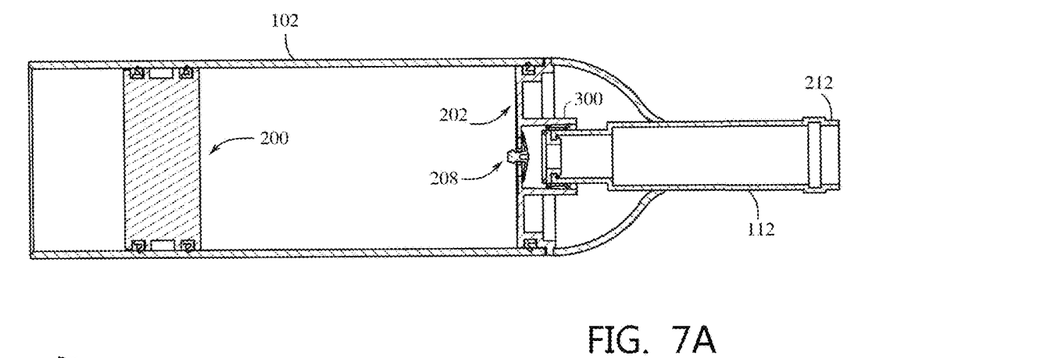
FIG. 7A is a cutaway side view of the wine dispensing device of FIG. 6, showing the valve of FIG. 6 in a closed condition.

FIG. 7A is a cutaway side view of the wine dispensing device of FIG. 6, showing the valve 208 of FIG. 6 in a closed condition, after being primed (removing substantially all the air from the dispenser body 102). This is called the "storage position". The dispenser 100 can be stored either upright or in a horizontal position. No wine 400 will flow unless a critical angle is reached by tipping the dispenser 100 downward similar to a pouring position for a typical wine bottle. The weight of the wine 400 together with the piston 200 is enough to overcome the minimum valve-opening pressure threshold of the umbrella valve 208, and the weight of the piston 200 alone keeps the valve 208 open until all the wine 400 has been dispensed by the wine dispensing device 100. The umbrella valve 208 flips shut when the minimum valve-stay-open pressure threshold can no longer be maintained, or when the dispenser 100 is tipped back to a horizontal level, or any angle towards the upright position. Note that the minimum valve-opening pressure threshold is greater than the minimum valve-stay-open pressure threshold. Also note that during pouring, no air can return into the dispenser body 102.

Figure 7B:
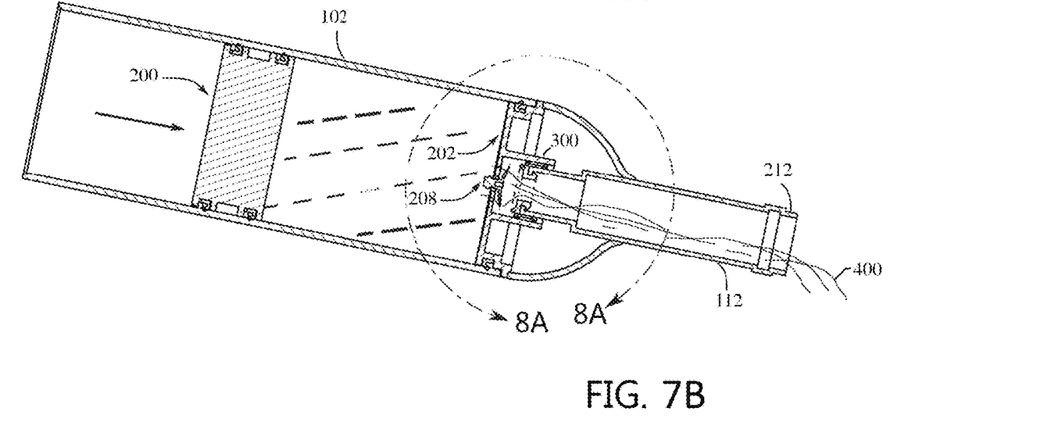
FIG. 7B is a cutaway side view of the dispensing device of FIG. 7A, showing the valve open so as to permit wine to flow out the neck of the wine dispensing device.

FIG. 7B is a cutaway side view of the dispensing device of FIG. 7A, showing the piston 200 advanced forward, and the valve 208 opened so as to permit wine 400 to flow out of the dispenser body 102 accordingly, and then out the neck 112 of the wine dispensing device 100.

Figure 8A:
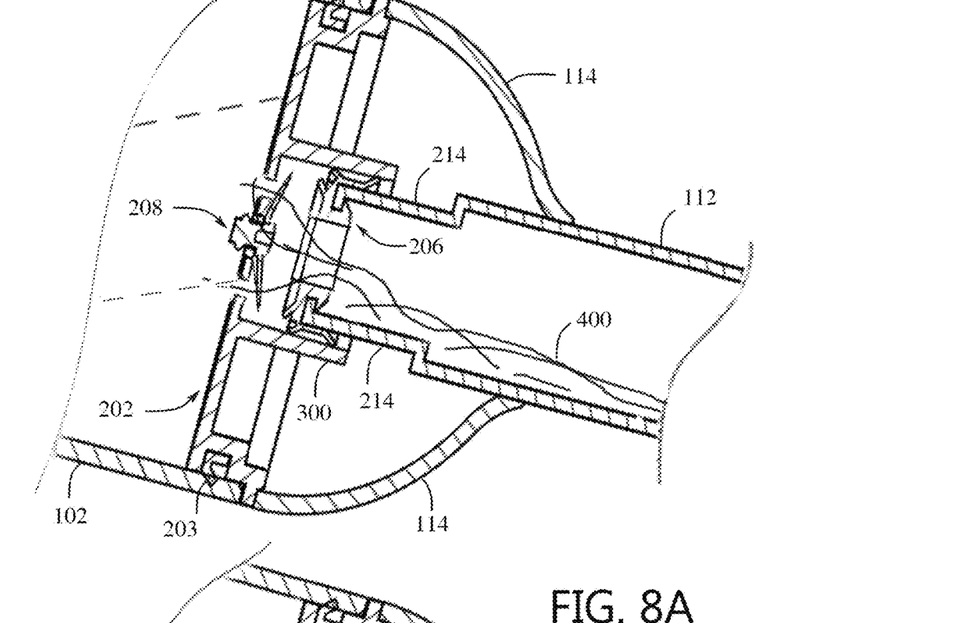
FIG. 8A is a cutaway side view of the dispensing device of FIG. 7B showing the open valve in detail.

FIG. 8A is a cutaway side view of the dispensing device of FIG. 7B showing the open valve 208 in detail and the wine 400 flowing from the dispenser body 102 out the neck 112.

The lid 202 is shown that is sealed to the dispenser body 102 via the lid seal 203. The shoulder 114 is shown fixedly connected to the lid 202, and slidably contacting the pouring neck 112. The lid 202 has a wine flow channel 204 that provides a path for wine 400 to flow out from the dispenser body 102 to the pouring neck 112.

Figure 8B:
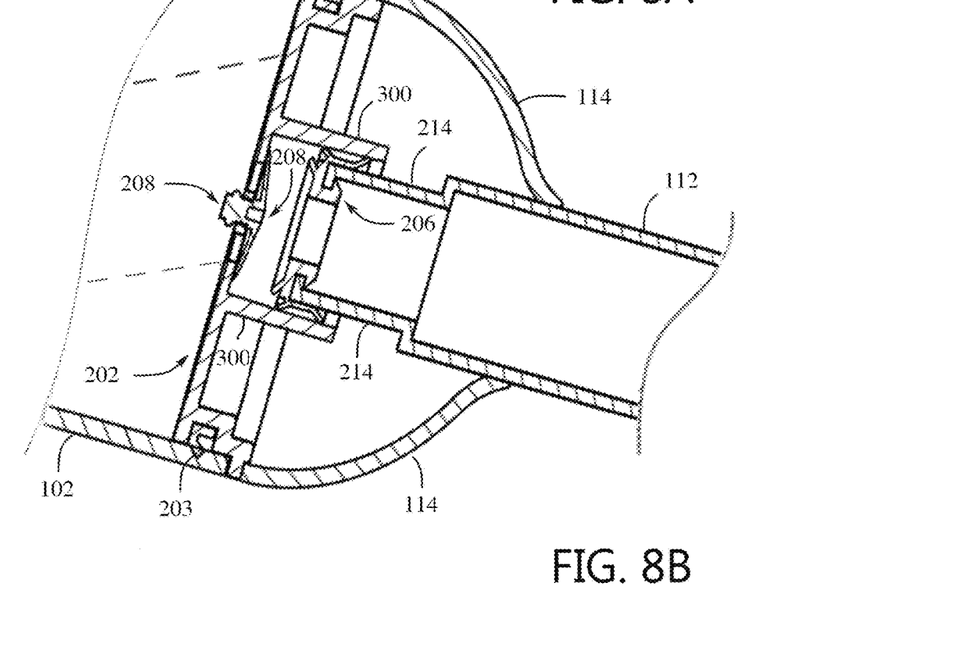
FIG. 8B is a cutaway side view of the dispensing device of FIG. 7A showing the closed valve in detail.
Figures 10A, 10B, 10C:
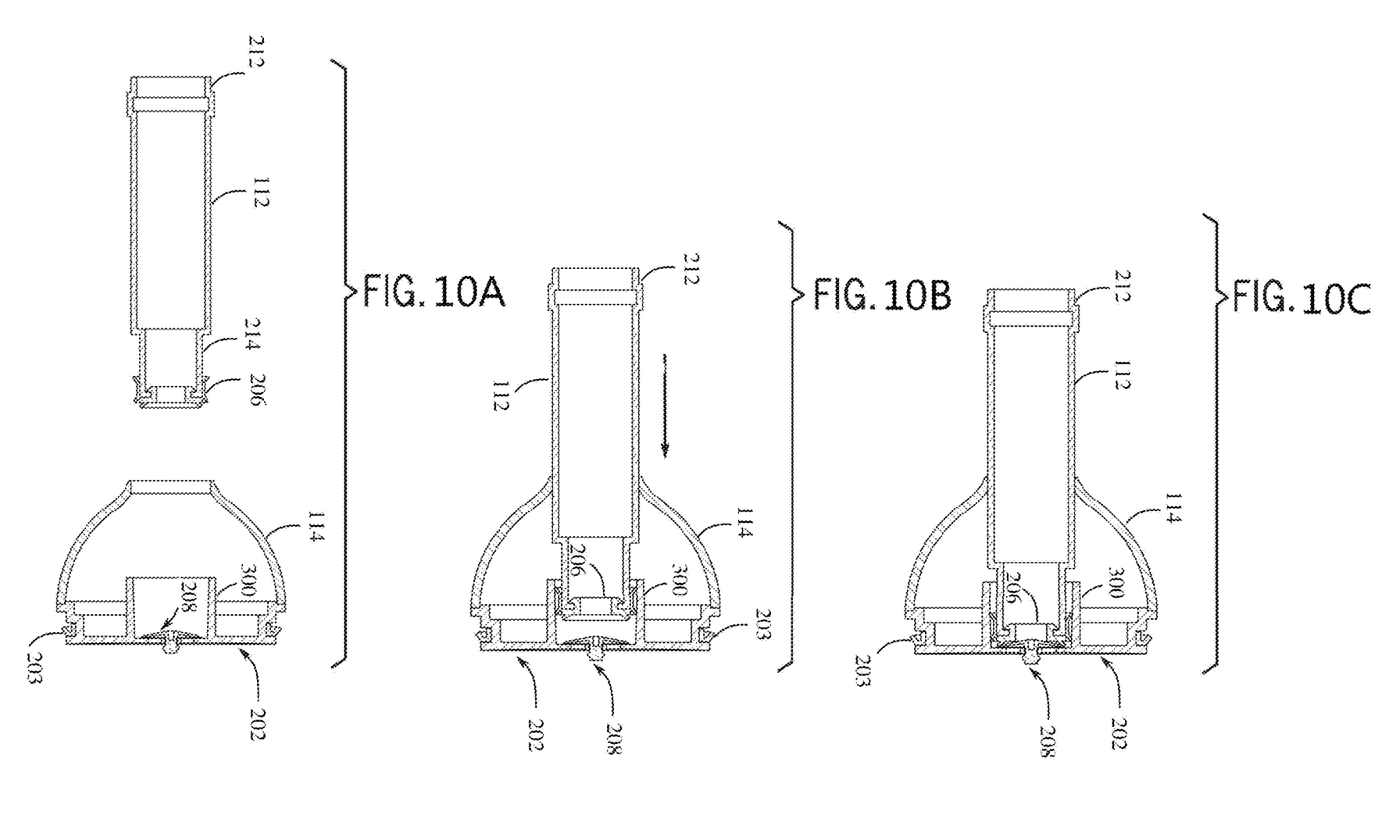
FIG. 10A is a cutaway side view of the top portion of the wine dispensing device shown in FIG. 9C, showing the spout separated from the decorative lid and the functional lid, the spout having a spout seal at the bottom.
FIG. 10B is a cutaway side view of the top portion of the wine dispensing device shown in FIG. 10A, showing the spout inserted into the decorative lid and the functional lid so as to provide an open position, allowing the unidirectional valve to permit wine to flow when a minimum threshold is achieved by tilting the dispensing device.
FIG. 10C is a cutaway side view of the top portion of the wine dispensing device shown in FIG. 10B, showing the spout inserted into the decorative lid and the functional lid so as to provide a closed position, causing the unidirectional valve to prevent wine from flowing due to the end of the spout pressing down upon the unidirectional valve, thereby preventing wine from escaping the dispensing device even when it is turned upside down.

The pouring neck seal 206 allows the receiving end 214 of the pouring neck 112 to sealably slide within the receiving collar 300 of the lid 202 between the open position shown in FIGS. 8A, 8B, and 10B, and the closed position shown in FIG. 10C. When the pouring neck 112 moves from the open position to the closed position, the neck 112 moves relative to the shoulder 114, which does not move.

Referring to FIG. 8B, The unidirectional flow valve 208 is normally biased in a closed air-tight state so as to prevent flow of wine out of the dispenser body 102 via the wine flow channel 204 unless the unidirectional flow valve 208 enters an open state (FIG. 8A) due to pressure created by the piston 200, thereby allowing wine to flow out from the dispenser body 102 via the wine flow channel 204 to the pouring neck 112.

Figure 9A:
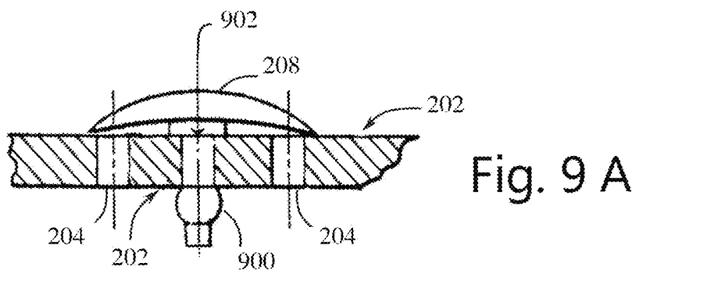
FIG. 9A is a close-up cutaway side view of the unidirectional valve of FIG. 8B showing the valve in the closed configuration.

FIG. 9A is a close-up cutaway side view of the unidirectional valve 208 of FIG. 8B showing the valve 208 in the closed position. The valve 208 has a tab 900 that is inserted into a hole 902 centrally located within the holes of the wine flow channel 204 of the lid 202. When in the closed position, the valve 208 blocks the holes of the wine flow channel 204.

Figure 9B:
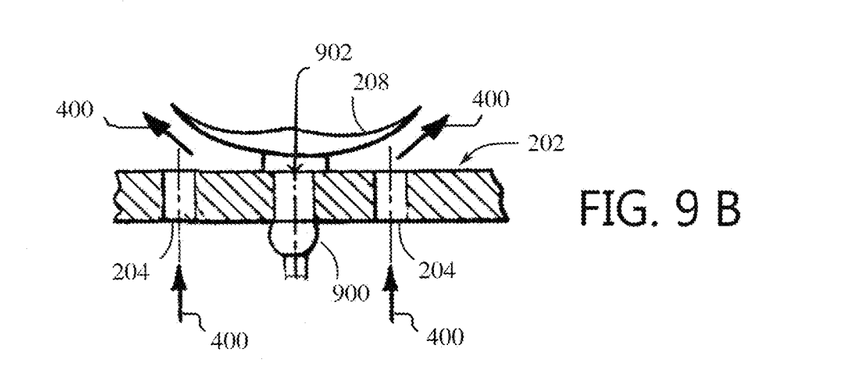
FIG. 9B is a close-up cutaway side view of the unidirectional valve of FIG. 8A showing the valve in the open configuration.

Referring to FIG. 9B, when in the open position, the valve 208 unblocks the holes of the wine flow channel 204 of the lid 202, thereby allowing wine 400 to flow out of the pouring neck 112.

Figure 9C:
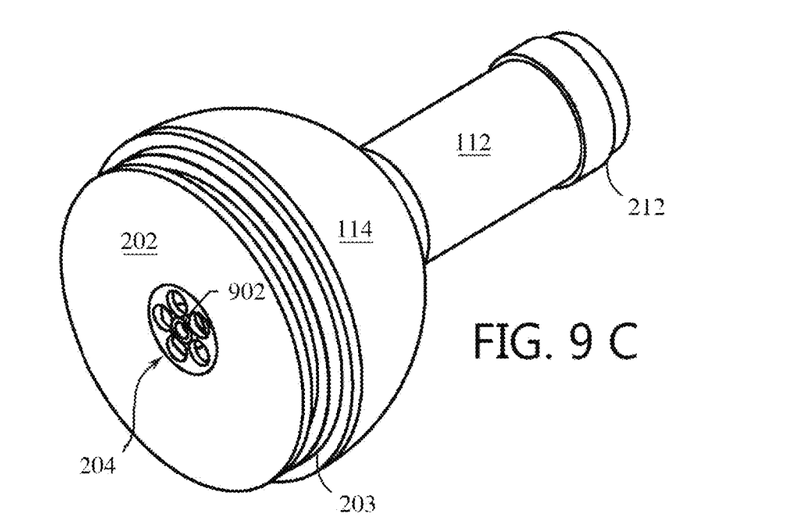
FIG. 9C is a perspective view from below of the top portion of the wine dispensing device, showing a plurality of holes in the plate of the unidirectional valve of FIGS. 9A and 9B, also showing the neck.

FIG. 9C is a perspective view from below of the upper portion 110 of the wine dispensing device 100, showing the holes of the wine flow channel 204 and the center hole 902 in the lid 202. The shoulder 114 is shown, also showing the pouring neck 112 having the pouring end 212. The upper portion 110 is inserted into the wine dispensing end 106 of the dispenser body 102, the seal 203 ensuring an air-tight and water-tight fit.

FIG. 10A is a cutaway side view of the top portion 110 of the wine dispensing device 100 shown in FIG. 9C, showing the pouring neck 112 completely separated from the shoulder 114 and from the receiving collar 300 of the lid 202, the neck 112 having a pouring neck seal 206 at the bottom 214. To assemble the top portion 110, the pouring neck 112 is inserted, pouring neck seal 206 first, into the shoulder 114, and then into the receiving collar 300 of the lid 202, resulting in the open configuration shown in FIG. 10B.

FIG. 10B shows the top portion 110 assembled, and in the open configuration that allows the valve 208 to function freely, such that when the dispenser 100 is tilted downward, the weighted piston 200 can slide towards the top portion 110 urging wine 400 to flow past the valve 208 into the pouring neck 112, and then out the pouring end 212. After a portion of the wine 400 in the dispenser 100 is poured, the dispenser 100 can be placed upright, and the valve 208 will return to a closed airtight state, and thereby preserve the wine 400 contained in the dispenser 100. Since the valve 208 only allows wine to flow therethrough, and will not allow air to flow into the dispenser body 102, the wine 400 remaining in the dispenser 100 is protected against oxidation.

With reference to FIGS. 10B and 10C, the pouring neck can be pushed downward towards the valve 208 into a locked position so that the pouring neck seal 206 presses against the valve 208, thereby preventing the valve 208 from opening, i.e., ensuring that the valve remains closed, even when the dispenser 100 is tilted downward. This also ensures that air will not pass through the valve 208 and enter the dispenser body 102. Note that while the pouring neck 112 moves downward, the pouring neck seal 206 sealably engages the inner wall of the receiving collar 300 that extends upward from the lid 202 and that surrounds the valve 208, while the pouring neck 112 slides into the shoulder 114. Also note that the bottom of the pouring neck seal 206 can be advantageously made to match the top of the umbrella valve 208, further ensuring that the valve 208 is securely locked by the pressure of the pouring neck seal against the valve 208.

FIG. 10C shows the neck 112 and the neck seal 206 pushed into a locked position down upon the umbrella valve 208. In this position, the umbrella valve 208 cannot open, even if the dispenser 100 is turned upside down. When storing wine in the dispenser 100 for a long time, such as a few years or more, the neck 112 of the dispenser 100 is pushed into the locked position.

Figure 10D:
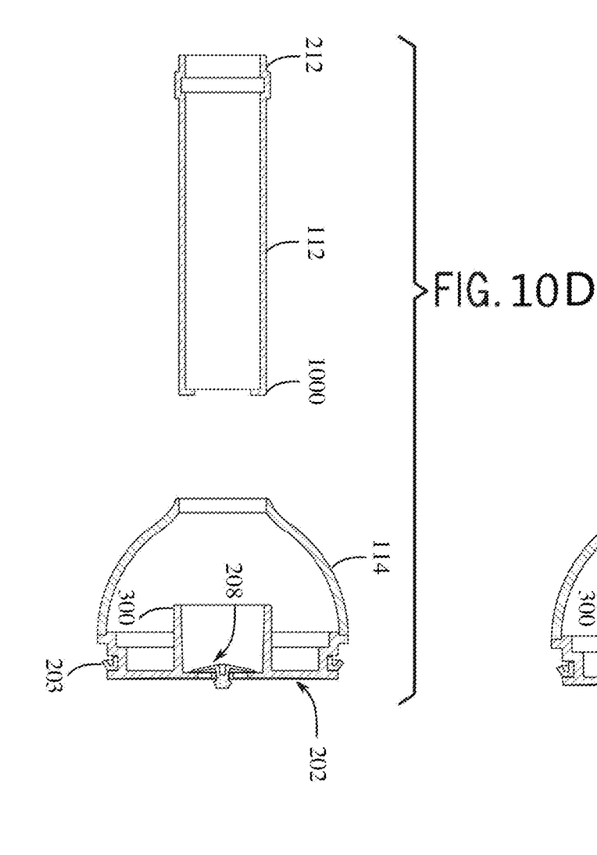
FIG. 10D is a cutaway side view of the top portion of a fixed spout embodiment of the wine dispensing device, showing the spout separated from the decorative lid and the functional lid, the spout having an inward flange at the bottom.

FIG. 10D is a cutaway side view of an alternate embodiment of the top portion 110 of the wine dispensing device 100 having a fixed spout, showing prior to assembly the pouring neck 112 separated from the shoulder 114 lid and the receiving collar 300 of the lid 202, the bottom of the neck 112 having an inward flange 1000.

In this embodiment, the neck 112 is permanently sealed to both the shoulder 114 and the receiving collar 300 of the lid 202, thereby ensuring no rotation or push or pull movement relative to the shoulder 114 and the lid 202. Note that in this embodiment, there is no spout seal 206. In this embodiment, a cork is inserted into the top 212 of the dispenser 100, and the dispenser 100 can be filled with wine and then stored in an upright position.

In some embodiments, the neck 112 and the receiving collar 300 of the lid 200 are sonically welded, thereby permanently joining them. In some embodiments, sonic welding can be used to join the neck 112 and the shoulder 114 lid too.

Figure 10E:
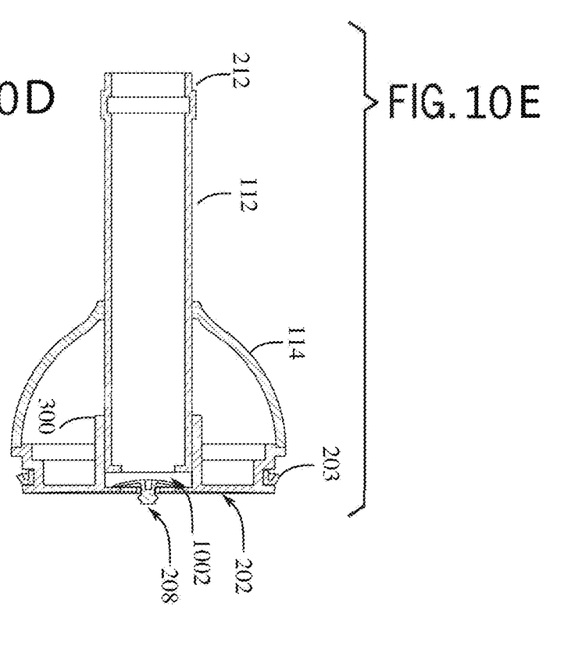
FIG. 10E is a cutaway side view of the top portion of the embodiment of FIG. 10D showing the spout fully inserted up to the circumferential shelf, thereby allowing the unidirectional valve to function freely, the spout being fixedly attached to the functional lid, and the decorative lid being fixedly attached to the spout.

FIG. 10E is a cutaway side view of the embodiment of FIG. 10D in an assembled state, showing the inward flange 1000 of the neck 112 inserted into the receiving collar 300 so as to leave a gap 1002 that is sufficient to allow the valve 208 to function freely. The portion of the neck 112 extending into the receiving collar 300 is fixedly attached thereto, such as by using sonic welding, to the inner surface of the receiving collar 300. The top of the shoulder 114 is also fixedly attached, such as by using sonic welding, to the outer surface of the neck 112.

Figure 11:
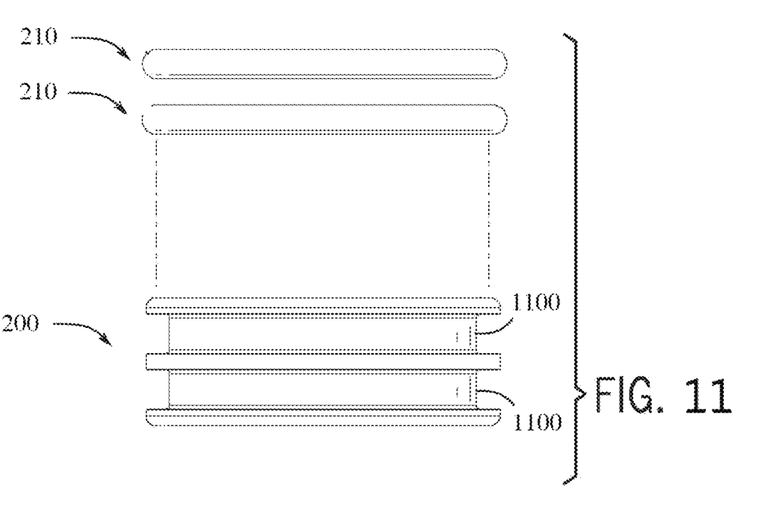
FIG. 11 is an exploded side view of a weighted piston having two circumferential slots, each for seating a respective O-ring for providing a sliding seal against the interior surface of the dispensing device.

FIG. 11 is an exploded side view of the weighted piston 200 having two circumferential slots 1100, each for seating a respective sealing ring 210 for providing a sliding seal against the interior surface of the dispenser body 102. The piston can be made from steel, high density plastic, composite, or other dense material, to allow gravitational force to act on the weighted piston so as to push the wine 400 out of the dispenser 100. The sealing rings 210 can be a substantially friction-free configuration of sealing rings, such as o-rings, piston seals with a z or v shaped cross-section. These sealing rings 210 can be coated with friction-free coatings, such as Slik-Sil® from Surface Solutions Group, Chicago, Ill., parylene types N, C, or D, internal lubricated silicone, dry lubricants, or similar coatings to achieve substantially friction-free performance that facilitates easy movement of the piston 200 within the dispenser body 102. Alternatively, the sealing rings 210 can be used without coating. It is also advantageous to maintain extremely high uniformity in the diameter along the length of the dispenser body 102 so as to achieve the least friction possible, while ensuring a durable, repeatable, long-term seal.

Figure 12:
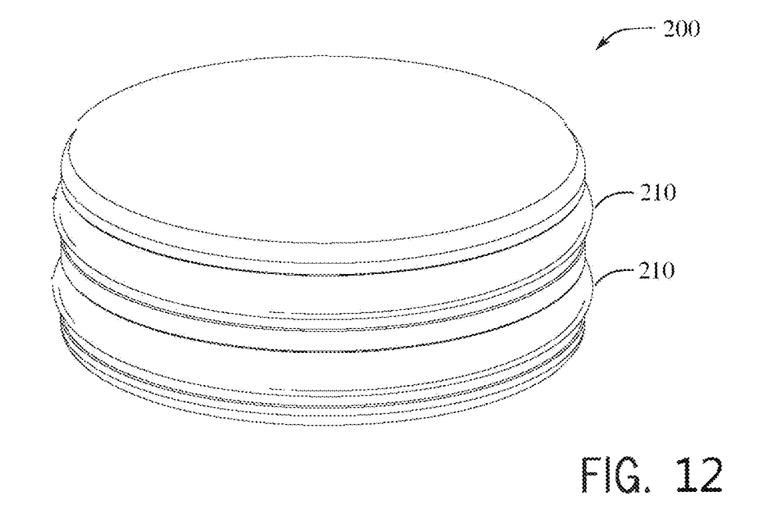
FIG. 12 is a perspective view of the weighted piston with each O-ring of FIG. 11 seated in a respective circumferential slot.

FIG. 12 is a perspective view of the weighted piston 200 with each sealing ring 210 of FIG. 11 seated in a respective circumferential slot 1100.

The wine dispenser 100 can protect any liquid that can be degraded by oxidation. Thus, for example, the dispenser can contain, protect, and dispense various edible oils, such as olive oil, or balsamic vinegar. Normally, a partially full bottle of oil will go rancid, and a partially full bottle of balsamic vinegar will oxidize. The dispenser 100 can be used to essentially "re-bottle" the contents of a partially filled bottle after using a portion of a full bottle.

Other modifications and implementations will occur to those skilled in the art without departing from the spirit and the scope of the invention as claimed. Accordingly, the above description is not intended to limit the invention, except as indicated in the following claims.

What is claimed is:

1. A wine dispenser that protects unpoured wine from oxidation, the wine dispenser comprising:
 a dispenser body configured to contain wine, the dispenser body having a piston-stop end and a wine dispensing end, the dispenser body having a portion of uniform cross section between the piston-stop end and the wine dispensing end;
 a weighted piston disposed within the dispenser body, the weighted piston being configured to move along the portion of uniform cross section toward the wine dispensing end of the dispenser body when wine is dispensed; and a dispensing assembly attached to the wine dispensing end of the dispenser body, the dispensing assembly including:

a lid sealed to the wine dispensing end of the dispenser body, the lid having a wine flow channel that provides a path for wine to flow out from the dispenser body;

a unidirectional flow valve, the unidirectional flow valve being attached to the lid so as to be cooperative with the wine flow channel, the unidirectional flow valve being biased in a closed air-tight state so as to prevent flow of air into the dispenser body via the wine flow channel, the unidirectional flow valve also being configured to allow wine to flow out from the dispenser body via the wine flow channel;

a pouring neck, the pouring neck having a pouring end and a receiving end, the receiving end being configured to receive any wine that flows out from the dispenser body via the wine flow channel, and guide the wine so as to exit the pouring neck via the pouring end; and a shoulder attached to the lid sealed to the wine dispensing end of the dispenser body, the shoulder being cooperative with the pouring neck, and the pouring neck being in fixed relationship with the shoulder.

2. The wine dispenser of claim 1, wherein the receiving end of the pouring neck is configured to be pressed against the unidirectional flow valve so as to seal the wine flow channel, thereby preventing flow of wine out of the dispenser body.

3. The wine dispenser of claim 1, wherein the weighted piston includes at least one sliding sealing ring, the weighted piston and the sliding sealing ring being sized so as to slidably seal the piston-stop end of the dispenser body.

4. The wine dispenser of claim 1, wherein the weighted piston includes two sliding sealing rings, the weighted piston and the sliding sealing rings being sized so as to slidably seal the piston-stop end of the dispenser body.

5. The wine dispenser of claim 1, wherein the lid sealed to the wine dispensing end of the dispenser body is sealed via a stationary sealing ring.

* * * * *